US009916872B1

(12) United States Patent
Amin-Shahidi et al.

(10) Patent No.: US 9,916,872 B1
(45) Date of Patent: Mar. 13, 2018

(54) DOUBLE-BARRIER VACUUM SEAL FOR SEALED DATA STORAGE SYSTEM

(71) Applicant: Western Digital Technologies, Inc., Irvine, CA (US)

(72) Inventors: Darya Amin-Shahidi, San Jose, CA (US); Vipin Ayanoor-Vitikkate, Union City, CA (US); Toshiki Hirano, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/384,785

(22) Filed: Dec. 20, 2016

(51) Int. Cl.
G11B 33/14 (2006.01)
G11B 33/02 (2006.01)

(52) U.S. Cl.
CPC .......... G11B 33/1466 (2013.01); G11B 33/02 (2013.01); G11B 33/1486 (2013.01)

(58) Field of Classification Search
CPC .. G11B 33/1466; G11B 33/02; G11B 33/1486
See application file for complete search history.

(56) References Cited

U.S. PATENT DOCUMENTS

| 4,488,192 A | 12/1984 | Treseder |
| 6,618,246 B2 | 9/2003 | Sullivan et al. |
| 6,831,811 B1 * | 12/2004 | Andrikowich ..... G11B 33/1446 360/99.22 |
| 7,538,972 B2 * | 5/2009 | Burts-Cooper ...... G11B 33/121 141/4 |
| 7,570,454 B1 * | 8/2009 | Andrikowich ....... G11B 25/043 141/66 |
| 7,986,490 B2 * | 7/2011 | Hirono .................. G11B 25/043 360/97.22 |
| 8,014,167 B2 * | 9/2011 | Gunderson ............ F16J 15/102 174/250 |
| 8,199,425 B1 * | 6/2012 | Gustafson .......... G11B 33/1486 360/97.12 |
| 8,248,724 B2 * | 8/2012 | Hayakawa ........... G11B 25/043 360/97.12 |
| 8,451,559 B1 * | 5/2013 | Berding ................ G11B 25/043 360/99.21 |
| 8,659,849 B2 | 2/2014 | Hayakawa et al. |
| 8,699,179 B1 * | 4/2014 | Golgolab ............. G11B 25/043 251/310 |
| 8,760,797 B1 * | 6/2014 | Beatty ................ G11B 33/1453 360/97.12 |
| 8,917,477 B1 * | 12/2014 | Miyake ................ G11B 33/146 360/97.18 |
| 9,001,458 B1 | 4/2015 | Vitikkate et al. |

(Continued)

Primary Examiner — Brian Miller
(74) Attorney, Agent, or Firm — John D. Henkhaus

(57) ABSTRACT

A data storage system assembly includes a hermetically-sealed enclosure, a double-barrier sealing system comprising first and second sealing members spaced from each other, and a vacuum source that operates in the space between sealing members to generate a lower pressure in the space than in the enclosure. A lighter-than-air gas may be enclosed in the enclosure, and a plurality of non-hermetically-sealed data storage devices may be housed within the enclosure. Air, humidity, and other contaminants may be intercepted by the vacuum system rather than leak into and pollute the sealed internal environment of the storage system enclosure.

18 Claims, 3 Drawing Sheets

(56) References Cited

U.S. PATENT DOCUMENTS

| | | | |
|---|---|---|---|
| 2003/0179489 A1* | 9/2003 | Bernett | G11B 33/1466 360/97.22 |
| 2005/0219740 A1* | 10/2005 | Repphun | G11B 33/1486 360/97.18 |
| 2007/0263319 A1* | 11/2007 | Calderon | G11B 33/1466 360/99.21 |
| 2012/0176701 A1* | 7/2012 | Schreck | G11B 33/148 360/97.22 |
| 2015/0034512 A1 | 2/2015 | Moffat et al. | |
| 2015/0359115 A1 | 12/2015 | Hirano et al. | |
| 2016/0057883 A1 | 2/2016 | Zebian | |

\* cited by examiner

DOUBLE-BARRIER VACUUM SEAL FOR SEALED DATA STORAGE SYSTEM

FIELD OF EMBODIMENTS

Embodiments of the invention may relate generally to data storage systems and, more particularly, to sealing of a data storage system such as one filled with a lighter-than-air gas.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack and the mechanical power used by the disk spindle motor. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the relative absence of corrosive gases or contaminants.

Furthermore, there is a commercial demand for high-capacity digital data storage systems, in which multiple hard disk drives (HDDs) are housed in a common enclosure. Data storage systems often include large enclosures that house multiple shelves on which rows of HDDs are mounted. For example, data storage systems may be suitable for use in data centers, enterprises, and the like.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a data storage system assembly, and a method for controlling the internal environment within a hermetically-sealed data storage system enclosure. A data storage system assembly comprises a hermetically-sealed enclosure, a double-barrier sealing system comprising first and second sealing members spaced from each other, and a vacuum source that operates in the space between sealing members to generate a lower pressure in the space than in the enclosure. Thus, air, humidity, and other contaminants may be intercepted by the vacuum system rather than leak into and pollute the sealed internal environment of the storage system enclosure. Embodiments may include a lighter-than-air gas enclosed in the enclosure, and a plurality of non-hermetically-sealed data storage devices housed within the enclosure.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a hermetically-sealed data storage system enclosure are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a hermetically-sealed data storage system enclosure, in which multiple hard disk drive (HDD) storage devices may be housed. Housed in such an environment, the operation of the HDDs may be affected. Thus, in accordance with an embodiment, a plan view illustrating an HDD 100 is shown in FIG. 1 to illustrate an exemplary operating context.

Figure 1:
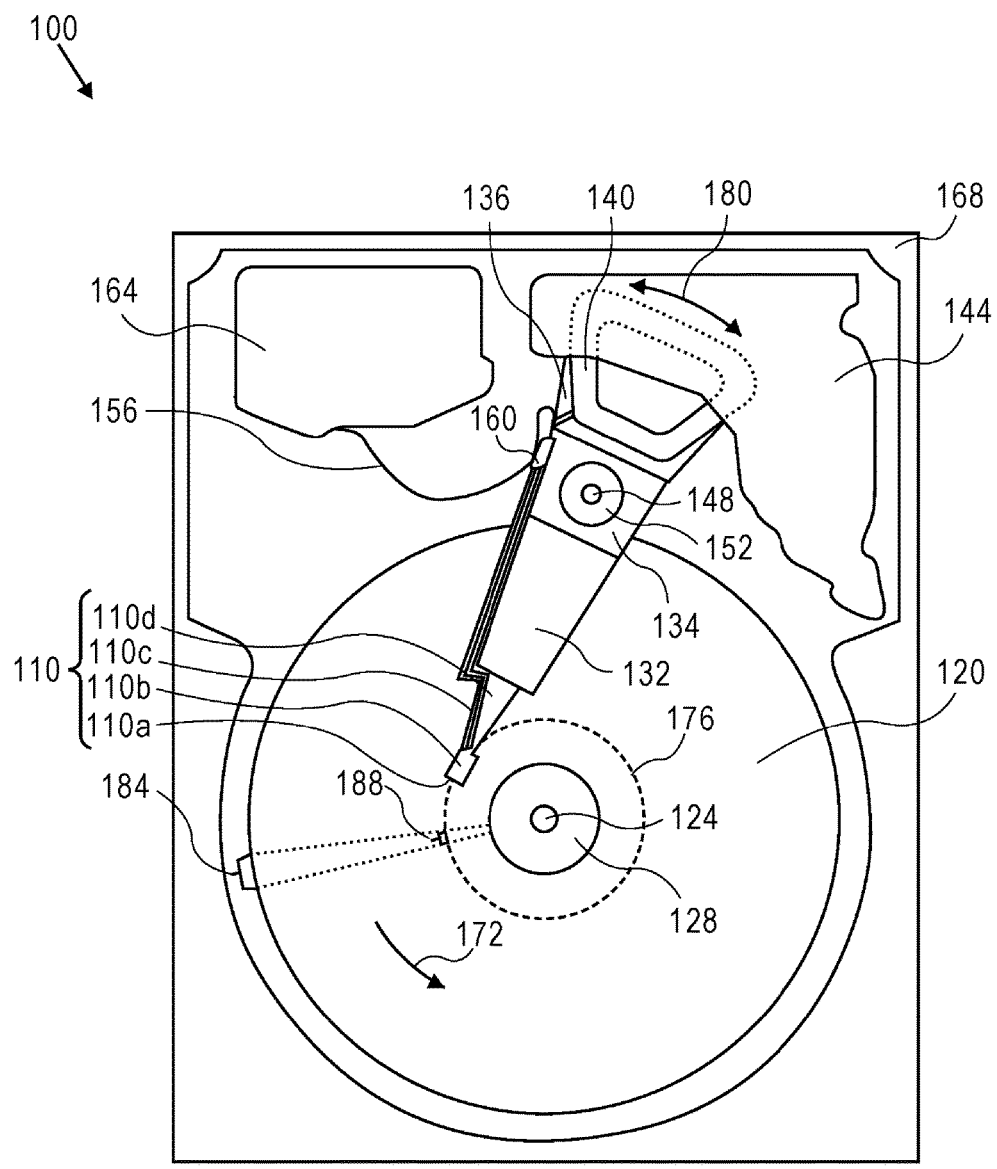
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically-sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As discussed, helium and other gases that are lighter than air have been contemplated for use as a replacement for air in sealed hard disk drives (HDDs), and that there is a commercial demand for digital data storage systems in which multiple HDDs or other data storage devices are housed in a common enclosure. Hence, one "hybrid" approach to high-capacity storage systems may be to provide system-level sealing of helium inside an enclosure in which multiple conventional HDDs are housed. Further, elastomeric seals are an attractive candidate for system-level sealing due to their ease of manufacturing and their low cost. However, a shortcoming with the use of elastomeric seals is their relative ineffectiveness at shielding against air, humidity, and other contaminants, which can pollute the sealed internal environment of a sealed data storage system and adversely affect operation of the HDDs housed therein. One approach attempting to overcome such ineffectiveness could be to employ a helium supply to constantly refresh the sealed volume and dilute the contaminants, but such an approach would require a significantly large-volume helium supply/canister.

Sealed Data Storage System Assembly

Figure 2:
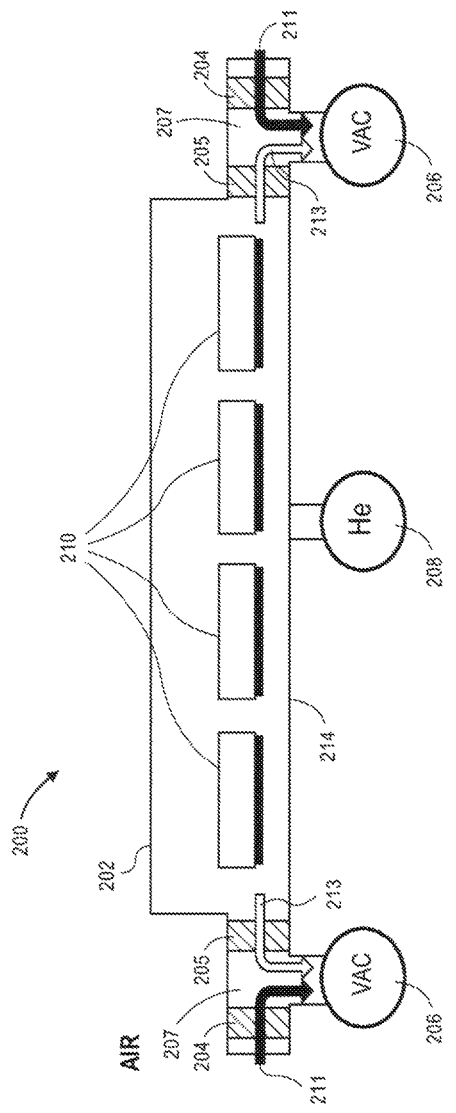
FIG. 2 is a cross-sectional side view diagram illustrating a data storage system with a double-barrier vacuum seal, according to an embodiment.

FIG. 2 is a cross-sectional side view diagram illustrating a data storage system with a double-barrier vacuum seal, according to an embodiment. Data storage system assembly 200 ("assembly 200") comprises a hermetically-sealed enclosure 202, a first sealing member (or simply "seal") 204 positioned at an interface of the enclosure 202 and external environment (e.g., air), a second sealing member (or simply "seal") 205 spaced from the first sealing member 204, and a vacuum source 206, according to an embodiment. The nature and composition of the sealing members 204, 205 may vary from implementation to implementation. For non-limiting examples, first sealing member 204 and second sealing member 205 may be elastomeric, adhesive (e.g., epoxy), laminate, and the like.

The vacuum source 206 operates in the space 207 between the first seal 204 and the second seal 205, as depicted, thereby generating a lower (fluid, or gaseous) pressure in the space 207 than the (fluid, or gaseous) pressure in the enclosure 202. The configuration of the pneumatic system embodying the vacuum source 206 may vary from implementation to implementation, and is illustrated simplistically for clarity in FIG. 2. For non-limiting examples, the vacuum (or pressure differential) may be provided by a vacuum pump, a vacuum line, a Venturi vacuum source, and the like. Furthermore, and according to embodiments, the vacuum source 206 may be configured to operate to continuously generate the lower pressure in the space 207, or may be configured to intermittently generate the lower pressure in the space 207. According to an embodiment, by generating a lower pressure in the space 207 than in the enclosure 202, the vacuum source further generates a lower pressure in the space 207 than the atmospheric pressure in the external environment.

In FIG. 2, while the assembly 200 is depicted as having two sets of first and second sealing members 204, 205 and vacuum sources 206, this is not intended to mean that the assembly 200 requires two such double-barrier vacuum seals. Rather, the depiction is intended to reflect an embodiment in which the assembly 200 comprises a base 214, at the perimeter of which the first and second sealing members 204, 205 are positioned and the vacuum source 206 operates. For a non-limiting example, the base 214 of the enclosure 202 may be generally rectangular in shape, where the first sealing member 204 and the second sealing member 205 are concentric FIPG (formed-in-place-gasket) seals positioned around the perimeter of the base 214, with a conduit or plenum pneumatic structure interposed therebetween for vacuum purposes.

According to an embodiment, assembly 200 further comprises a lighter-than-air gas enclosed within the hermetically-sealed enclosure 202. For non-limiting examples, a substantially helium or substantially nitrogen gas may be injected into and maintained within the enclosure 202. Thus, according to an embodiment, the assembly 200 further comprises a source 208 of the lighter-than-air gas, which is configured to replace relatively small amounts of gas that may escape or leak from the enclosure (keeping in mind that in practice, in the context of digital data storage, a hermetically-sealed container may have a minute but acceptable leakage rate). Furthermore, and according to an embodiment, the source 208 may be configured to substantially maintain a certain lighter-than-air gas pressure within the enclosure 202. The configuration of the pneumatic system embodying the lighter-than-air gas source 208 may vary from implementation to implementation, and is illustrated simplistically for clarity in FIG. 2. For non-limiting examples, the gas source 208 pneumatic system may include an active sensing and control mechanism(s) for maintaining the pressure inside of the enclosure 202.

Based on the foregoing configuration of assembly 200, air, humidity and other contaminants (depicted as block arrow 211) that might otherwise migrate into the sealed enclosure 202 through the first and second sealing members 204, 205, may be intercepted (and possibly absorbed/adsorbed) by the vacuum source 206 and associated pneumatic system. Hence, because such humidity, contaminants, etc. are largely kept out of the sealed enclosure 202, the need for a bulky large-volume gas replacement canister is not likely needed with such a system because large-scale gas volume replenishment and purification is not likely necessary.

Similarly but in the other direction, based on the foregoing configuration of assembly 200, lighter-than-air gas (depicted as block arrow 213) that might otherwise leak out of the sealed enclosure 202 through the first and second sealing members 204, 205, may be intercepted by the vacuum source 206 and associated pneumatic system, where the pneumatic system may be configured such that the leaked gas is filtered and recirculated back into the enclosure 202. Further, an internal filter/recirculation system may be implemented within the enclosure 202 in order to filter contaminants that may be generated inside of the enclosure 202.

Hence, a double-barrier vacuum seal (i.e., the first and second sealing members 204, 205, along with the vacuum source 206) assembly, such as assembly 200, can be utilized to house a plurality of data storage devices within the hermetically-sealed (and climate-controlled) enclosure 202. According to an embodiment, a plurality of non-hermetically-sealed data storage devices (e.g., hard disk drives) are housed in the enclosure 202 of assembly 200.

Figure 3:
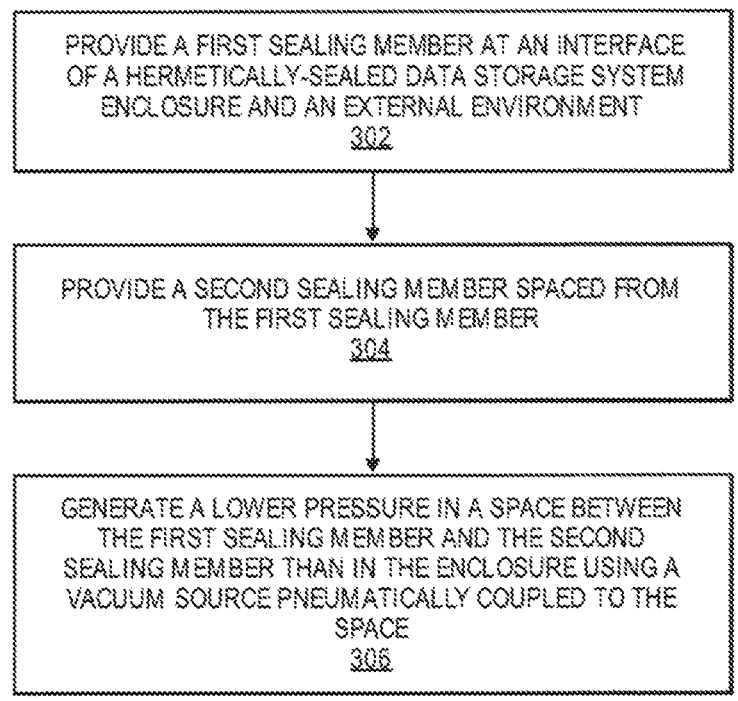
FIG. 3 is a flow diagram illustrating a method for controlling the internal environment within a hermetically-sealed data storage system enclosure, according to an embodiment.

Method for Controlling the Internal Environment within a Hermetically-Sealed Data Storage System Enclosure FIG. 3 is a flow diagram illustrating a method for controlling the internal environment within a hermetically-sealed data storage system enclosure, according to an embodiment. An example use includes controlling the internal environment within the hermetically-sealed enclosure 202 of the data storage system assembly 200 of FIG. 2.

At block 302, a first sealing member is provided at an interface of a hermetically-sealed data storage system enclosure and an external environment. For example, first sealing member 204 (FIG. 2) is provided at an interface between the enclosure 202 (FIG. 2) and the external atmosphere (air).

At block 304, a second sealing member is provided, spaced from the first sealing member. For example, second sealing member 205 (FIG. 2) is provided, spaced from the first sealing member 204 by the space 207 (FIG. 2) therebetween.

At block 306, a lower pressure is generated in a space between the first sealing member and the second sealing member than in the enclosure, using a vacuum source pneumatically coupled to the space. For example, a lower pressure is generated (e.g., continuously or intermittently) in the space 207 between the first sealing member 204 and the second sealing member 205 than in the enclosure 202, using a vacuum source 206 (FIG. 2) pneumatically coupled to the space 207. As previously described, generating the lower pressure at block 306 may include also generating a lower pressure in the space 207 than in the external environment.

According to embodiments, a plurality of non-hermetically-sealed data storage devices (e.g., data storage devices 210 of FIG. 2) may be housed in the enclosure 202, a lighter-than-air gas injected into the enclosure 202, and a lighter-than-air gas source 208 pneumatically coupled to the enclosure 202, operating to replace gas that escapes the enclosure 202 and/or maintain a certain lighter-than-air gas pressure within the enclosure 202.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system assembly comprising:
a hermetically-sealed enclosure;
a first sealing member at an interface of said enclosure and an external environment;
a second sealing member spaced from said first sealing member; and
a vacuum source, operating in a space between said first sealing member and said second sealing member, thereby generating a lower pressure in said space than in said enclosure and than in said external environment.

2. The data storage system assembly of claim 1, further comprising:
a lighter-than-air gas enclosed in said enclosure; and
a source of lighter-than-air gas pneumatically coupled to said enclosure and configured to replace gas that escapes from said enclosure.

3. The data storage system assembly of claim 1, further comprising:
a lighter-than-air gas enclosed in said enclosure; and
a source of lighter-than-air gas pneumatically coupled to said enclosure and configured to substantially maintain a certain lighter-than-air gas pressure within said enclosure.

4. The data storage system assembly of claim 1, further comprising:
a plurality of data storage devices housed in said enclosure.

5. The data storage system assembly of claim 4, wherein said data storage devices are non-hermetically-sealed data storage devices.

6. The data storage system assembly of claim 4, further comprising:
a lighter-than-air gas enclosed in said enclosure; and
a source of lighter-than-air gas configured to replace gas that escapes from said enclosure.

7. The data storage system assembly of claim 1, wherein said vacuum source is configured to continuously generate said lower pressure.

8. The data storage system assembly of claim 1, wherein said vacuum source is configured to intermittently generate said lower pressure.

9. The data storage system assembly of claim 1, wherein:
said enclosure comprises a base; and
said first and second sealing members are positioned at a perimeter of said base.

10. A method for controlling the internal environment within a hermetically-sealed data storage system enclosure, the method comprising:
providing a first sealing member at an interface of said enclosure and an external environment;
providing a second sealing member spaced from said first sealing member; and
generating a lower pressure in a space between said first sealing member and said second sealing member than in said enclosure and than in said external environment using a vacuum source pneumatically coupled to said space.

11. The method of claim 10, further comprising:
injecting a lighter-than-air gas into said enclosure; and replacing gas that escapes from said enclosure using a source of lighter-than-air gas pneumatically coupled to said enclosure.

12. The method of claim 10, further comprising:
injecting a lighter-than-air gas into said enclosure; and
substantially maintaining a certain lighter-than-air gas pressure within said enclosure using a source of lighter-than-air gas pneumatically coupled to said enclosure.

13. The method of claim 10, further comprising:
housing a plurality of data storage devices in said enclosure.

14. The method of claim 13, wherein housing includes housing non-hermetically-sealed data storage devices in said enclosure.

15. The method of claim 13, further comprising:
injecting a lighter-than-air gas into said enclosure; and
replacing gas that escapes from said enclosure using a source of lighter-than-air gas pneumatically coupled to said enclosure.

16. The method of claim 10, wherein generating said lower pressure includes continuously generating said lower pressure.

17. The method of claim 10, wherein generating said lower pressure includes intermittently generating said lower pressure.

18. The method of claim 10, wherein providing said first sealing member and providing said second sealing member includes positioning said first and second sealing members at a perimeter of a base of said enclosure.

* * * * *